United States Patent [19]

Bhagwat et al.

[11] 4,344,123
[45] Aug. 10, 1982

[54] MULTILEVEL PWM INVERTER

[75] Inventors: Pradeep Bhagwat, Baltimore, Md.; Victor R. Stefanovic, Charlottesville, Va.

[73] Assignee: Canadian Patents & Development Limited, Ottawa, Canada

[21] Appl. No.: 301,755

[22] Filed: Sep. 14, 1981

[51] Int. Cl.³ .............................................. H02M 1/12
[52] U.S. Cl. ........................................ 363/43; 307/107
[58] Field of Search .................................... 363/40–43, 363/136; 307/106, 107

[56] References Cited

U.S. PATENT DOCUMENTS

| | | | |
|---|---|---|---|
| 1,691,986 | 11/1928 | Nyquist | 363/43 |
| 3,100,851 | 8/1963 | Ross et al. | 363/43 X |
| 3,324,374 | 6/1967 | Corey | |
| 3,932,798 | 1/1976 | Chalmers et al. | 363/136 X |
| 4,047,083 | 9/1977 | Plunkett | |
| 4,135,235 | 1/1979 | Baker | |

OTHER PUBLICATIONS

"Generalized Techniques of Harmonic Elimination and Voltage Control in Thyristor Inverters: Part II-Voltage Control Techniques," Hasmukh Patel & Richard Hoft, IEE Transactions on Industry Applications, vol. 1A-10, No. 5, Sep./Oct., 1974.

"Methods for Optimizing the Waveform of Stepped-Wave Static Inverters," Philip D. Corey, Reprinted from Paper 62-1147, Presented at the AIEE Summer General Meeting, Jun. 17, 1962.

Primary Examiner—William M. Shoop
Attorney, Agent, or Firm—Edward Rymek

[57] ABSTRACT

The multilevel inverter includes a voltage divider which when connected across a dc source $E_D$, provides voltage at terminals having values between $+E_D$ to $-E_D$. A first and a second set of thyristors pairs are connected between the positive or negative terminals, respectively, and a load terminal for applying selected voltage levels to the load. Any thyristor pair in these sets may be turned-off by firing the thyristor pair at the next highest voltage level. However, the main thyristors which are connected to the $+E_D$ or $-E_D$ terminal is turned-off by a commutation circuit. This circuit includes a single capacitor maintained at zero voltage and subjected to an oscillating voltage during the commutation cycle to turn-off the conducting main thyristor. Such an inverter can easily provide a waveform having a series of pulses at one or more voltage levels thereby eliminating harmonics in the output.

5 Claims, 3 Drawing Figures

MULTILEVEL PWM INVERTER

BACKGROUND OF THE INVENTION

This invention is directed to a multilevel pulse width modulated inverter and, in particular, to a thyristor-inverter having a wide range of voltage control with harmonic elimination.

The ever increasing use of static power converters in variable speed motor devices is highlighting the problem of harmonic distortion in the voltage and current waveforms of present adjustable voltage, adjustable frequency square wave inverters.

Presently, harmonic reduction is achieved by three basic methods: (a) multilevel waveforms, (b) sinusoidal pulse-width modulation, and (c) pulse width control.

Multilevel operation can be achieved by summing the outputs of several inverters operating in parallel through phase shift transformers as described in U.S. Pat. No. 3,324,374, which issued on June 6, 1967, to P. D. Corey. This technique requires large reactive elements and is no longer attractive. Recently, as described in U.S. Pat. No. 4,135,235, which issued to R. H. Baker on Jan. 16, 1979, transistor inverters with multilevel voltage waveforms have been proposed. While providing an efficient reduction in harmonic distortion, the inverter has limited power levels due to the ratings of available power transistors.

By chopping a voltage under the control of a sinusoidal signal, as described in U.S. Pat. No. 4,047,083, which issued on Sept. 6, 1977, to A. Plunkett, all dominant harmonics can be eliminated, however, only partial power can be obtained. By producing several pulses during each half-period of the output waveform and by controlling their width, selected harmonics can be eliminated from the inverter output. However, such an inverter is still derated and voltage control is limited.

SUMMARY OF THE INVENTION

It is therefore an object of this invention to provide a power inverter having flexibility of operation and control.

The multilevel inverter in accordance with the present invention includes a voltage divider which connects across a dc source $E_D$ and provides voltages at terminals in a decreasing sequence from $+E_D$ to $-E_D$. A first set of controlled ac switches are connected between the positive voltage terminals and a load terminal whereby selected positive voltages may be applied to the load terminal. A second set of controlled ac switches are connected between the negative voltage terminals and the load terminal whereby selected negative voltages may be applied to the load terminal. The controlled ac switches which are nearer the zero voltage level may be turned-off by turning on a main controlled rectifier at the $+E_D$ or $-E_D$ voltage level which has a reverse connected diode across it. The commutation circuit for turning-off either of the main controlled rectifiers includes a pair of series-connected commutation controlled rectifiers connected in parallel with the pair of main controlled rectifiers, a diode connected in reverse polarity across each of the commutation controlled rectifiers, a capacitor connected between the load terminal and a juncture between the commutation controlled rectifiers, and an inductance connected in the circuit between the load terminal and the dc source. When it is desired to commutate one of the main controlled rectifiers, the appropriate commutation controlled rectifier is fired causing a reverse voltage to be applied across the main controlled rectifier, turning it off. The inverter may further include an ac switch connected across the capacitor to discharge it between commutation cycles. An ac switch may also be connected between the load terminal and a zero potential in order to ground the load terminal during portion of the inverter cycle. The ac switches and controlled rectifiers may be thyristor pairs and thyristors, respectively.

Many other objects and aspects of the invention will be clear from the detailed description of the drawings.

DETAILED DESCRIPTION

In order to generate high power ac for motors or other loads, it is essential to minimize the harmonics by techniques other than filtering which constitutes a power loss. Low order harmonics may be avoided at inverter outputs by producing optimized stepped waveforms, pulse width modulated waveforms or both.

Figure 1:
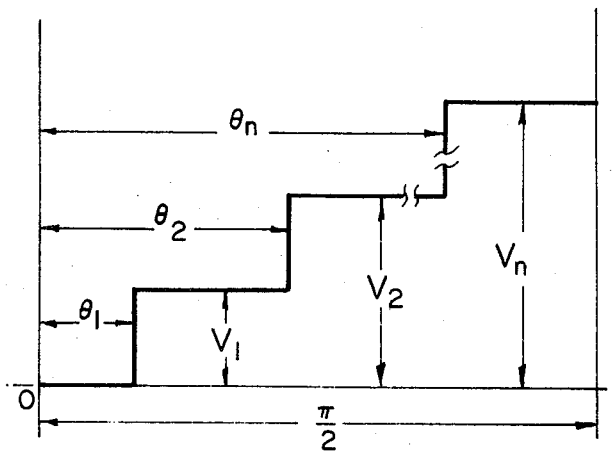
FIG. 1 illustrates a generalized stepped waveform.

In generating stepped waveforms, many trade-offs may be made in the final selection of the step variables, as described in the publication "Methods for Optimizing the Waveform of Stepped-Wave Static Inverters" by P. D. Corey, IEEE Transactions CP62, 1147, Denver, June 17–22, 1962. The variables in the generalized stepped waveform shown in FIG. 1 are the number of steps the relative height of the steps, $V_1$, $V_2-V_1$, ..., $(V_n-V_{n-1})$, and the relative width of the steps, $(\theta_1, \theta_2-\theta_1, \ldots, \theta_n-\theta_{n-1})$. By setting these variables at particular values, undesirable harmonics may be eliminated or the total harmonic distortion (THD) may be minimized. THD is equal to $V_t^2/V_f^2 - 1$ where $V_t$ is the RMS value of the stepped waveform and $V_f$ is the RMS value of the fundamental waveform.

In addition, selected harmonics may also be eliminated by optimizing the notch widths of a PWM waveform, as described in the publication, "Generalized Techniques of Harmonic Elimination and Voltage Control in Thyristor Inverters" by H. S. Patel et al, Part II, Voltage Control Techniques—IEEE Transactions on Industrial Applications, Vol. No. IA-10, No. 5, September/October 1974, pp 666–673. In general, the number of harmonics eliminated is related to the number of switchings occurring in a half cycle, i.e. the stepped waveform eliminates one harmonic per switching while the PWM waveform eliminates one harmonic for every two switchings. Thus a versatile inverter capable of controlled switchings, whether step or PWM, can output waveforms for a variety of loads.

Figure 2:
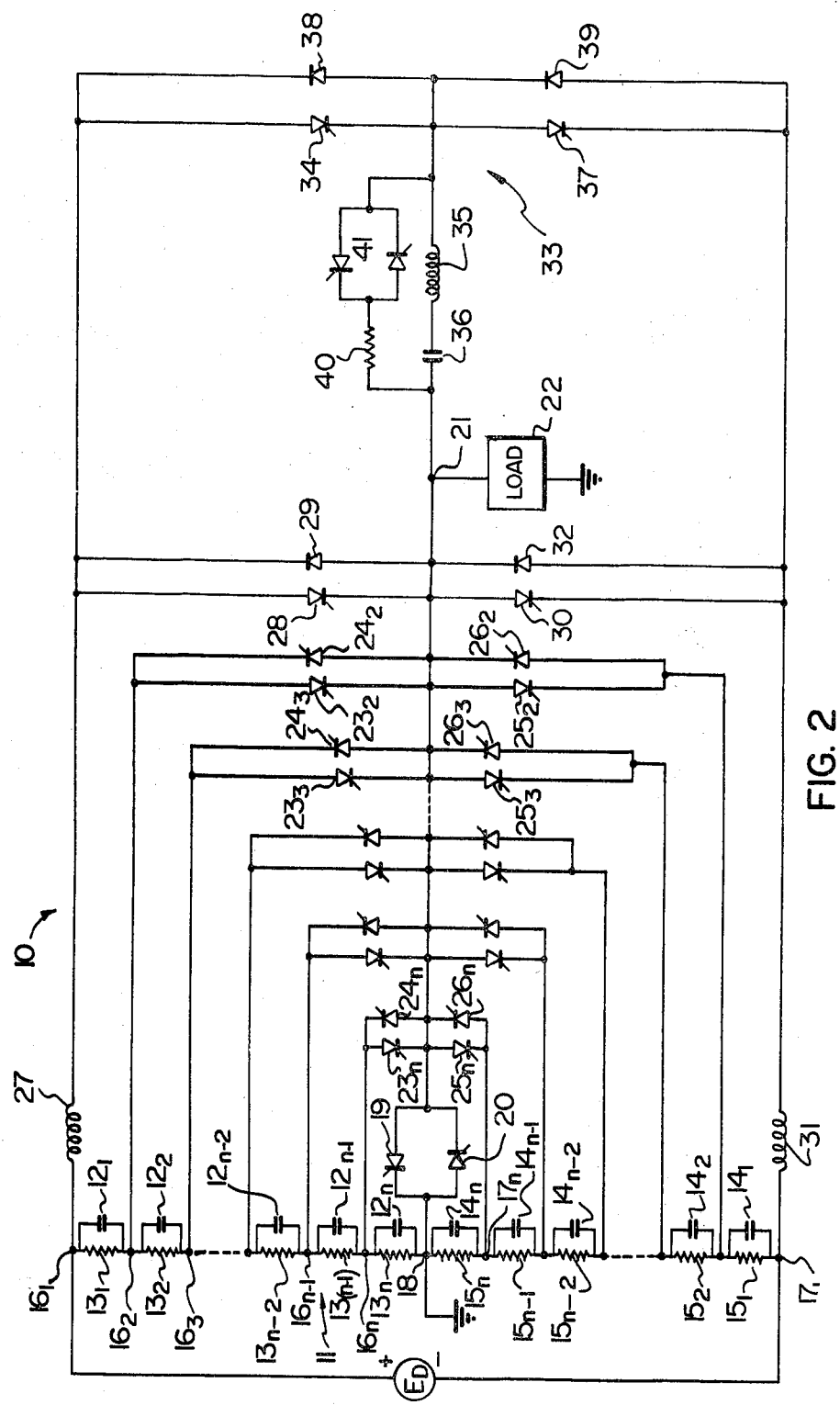
FIG. 2 is an inverter in accordance with this invention.

The multilevel pulse width modulated (PWM) inverter 10, in accordance with this invention, illustrated in FIG. 2 is a single phase half-bridge inverter. The inverter 10 includes a voltage source $E_D$ feeding a voltage divider 11 made up of series connected capacitor $12_1$–$12_n$ in parallel with resistors $13_1$–$13_n$ in the positive branch and series connected capacitors $14_1$–$14_n$ in parallel with resistors $15_1$–$15_n$ in the negative branch. This provides voltages of $E_D$, $E_D/2$, ... $E_D/n$ at terminals $16_1$ to $16_n$, $-E_D$, $-E_D/2 \ldots -E_D/n$ at terminals $17_1$ to $17_n$, and a zero voltage at terminal 18.

A pair of thyristors 19 and 20 are connected back to back between terminal 18 and output terminal 21 to apply the zero voltage to a load. Further back to back thyristor pairs $23_2$-$24_2$ to $23_n$—$24_n$ are connected between terminals $16_2$ to $16_n$, respectively, and output terminal 21, while back to back thyristor pairs $25_2$-$26_2$ to $25_n$-$26_n$ are connected between terminals $17_2$ to $17_n$, respectively, and output terminal 21. An inductor 27 is connected in series with a maximum voltage thyristor 28 in the forward direction between terminals $16_1$ and 21. A diode 29 is reverse connected across the thyristor 28. A thyristor 30 is connected in the forward direction and in series with an inductor 31 between terminals 21 and $17_1$. A diode 32 is reverse connected across the thyristor 30. The thyristor pairs may be SCR pairs, triacs or any other similarly controlled ac switches.

The commutation circuit 33 for inverter 10 may be of the type described in Canadian patent application Ser. No. 363,141 filed Sept. 25, 1980 which corresponds to U.S. patent application Ser. No. 296,296, hereby incorporated be reference, which was filed on Aug. 26, 1981 naming the inventors P. Bhagwat and V. Stefanovic. The commutation circuit 33 illustrated in FIG. 2 includes a series connected thyristor 34, an inductor 35 and a commutation capacitor 36 connected across thyristor 28; with the capacitor 36, inductor 35 and a further thyristor 37 forming a second series circuit connected across thyristor 30. Diodes 38 and 39 are reverse connected across thyristors 34 and 37, respectively.

The voltage divider provides 2n voltage levels which may be applied to the load 22 in any desired sequence by turning on and off the appropriate thyristors in the desired sequence. This will provide a multilevel output. Any particular thyristor pair may also be controlled to turn on and off a number of times for and during predetermined durations. This will provide a pulse width modulated output.

Any thyristor pair may be turned on by applying an appropriate pulse to their gates. In order to turn off the conducting thyristor in the pair, a reverse voltage must be applied across the thyristor pair.

To generalize the process of commutation, it is necessary to define the current through terminal 21 to the load as follows. Current $I_{21}$ is defined as positive current if it is going away from terminal 21 to the load 22. Current $I_{21}$ is defined as a negative current, if it is coming from the load 22 to terminal 21.

From these definitions, it is clearly seen that if $I_{21}$ is positive, only semiconductors whose cathodes are connected to the terminal 21 can conduct, one at a time, i.e. thyristors 20, $23_1$-$23_n$, $26_1$-$26_n$, 28 and diode 32. If $I_{21}$ is negative, then any one of the semiconductors whose anode is connected to terminal 21 can conduct, one at a time, i.e. thyristors 19, $24_2$-$24_n$, $26_2$-$26_n$, 30 and diode 29.

Under normal operation, however, due to di/dt restrictions, during commutation, the incoming and outgoing semiconductors will conduct at the same time, until a current transfer from one semiconductor to other is finished.

From the above definitions, the process of commutation can be divided into four cases as follows: (a) commutation of a thyristor when current is positive and is transferred from any semiconductor to a semiconductor at a higher potential; (b) commutation of a thyristor when current is positive and is transferred from any semiconductor to a semiconductor at a lower potential; (c) commutation of a thyristor when current is negative and is transferred from any semiconductor to a semiconductor at a higher potential; and (d) commutation of a thyristor when current is negative and is transferred from any semiconductor to a semiconductor at a lower potential.

From FIG. 2, it is noted that commutation of a thyristor is automatically achieved for the cases (a) and (d), when desired current transfer is done by turning on the second or incoming thyristor. This is due to the fact that when a current transfer is made, previously conducting, thyristor automatically becomes reverse biased, and therefore, special forced commutation is not required. For example, if thyristor $23_n$ is conducting and thyristor $23_{(n-1)}$ is turned on, the voltage $E_D/(n-1)$ is applied to the cathode of thyristor $23_n$ turning it off since its anode is connected to the lower voltage $E_D/n$. For the cases (b) and (c), special forced commutation process is required to turn off the conducting thyristor.

It is further noted that if a positive current is free wheeling in the free wheeling diode 32, at the extreme negative reference, $-E_D$, it can be transferred to any of the remaining voltage references, without any commutation process since the load terminal 21 is at the extreme potential and similarly a negative current can be transferred to any of the remaining voltage references if it is free wheeling in the free wheeling diode 29 at the extreme positive reference, since the load terminal is at this extreme potential.

The commutation process for cases (b) and (c) requires the following steps:
(1) The thyristor 28 or thyristor 30 is triggered for cases (b) and (c) respectively, this turns off the thyristor to be commutated.
(2) The triggered thyristor 28 or 30 is turned off by the commutation circuit 33 by firing thyristor 37 or 34, respectively. This transfers the current to the free wheeling diode 32 or 29, respectively, at the complementary reference.
(3) The current is transferred to any desired thyristor $23_2$-$24_n$ or $25_2$-$25_n$, respectively, which may be the same thyristor that was originally conducting or one nearer the zero voltage level.

If commutation is done by conventional precharge capacitor techniques, at least two commutation circuits are required. In a PWM system, the same positive or negative thyristor may have to be turned on or off repeatedly during a portion of the cycle and the charge on the capacitor would be of the wrong polarity. In the commutation circuit 33 described with regard to the inverter 10, the commutation capacitor 36 has a zero charge at the beginning and end of each commutation cycle and therefore, is ready for the commutation of the next thyristor of any polarity.

At times, the commutation capacitor 36 may not be completely discharged after a commutation cycle. In order to assure a zero potential on the capacitor 36, a discharge circuit consisting of a resistor 40 and an ac switch 41 is connected across the capacitor 36.

Figure 3:
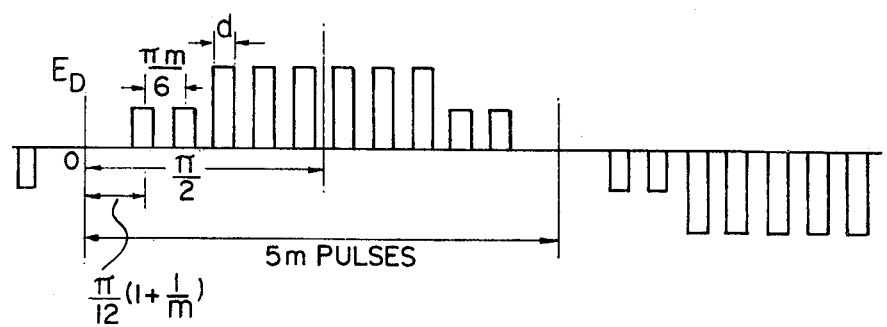
FIG. 3 illustrates a symmetrical PWM three-level waveform generated by the inverter.

FIG. 3 illustrates an example of a symmetrical PWM three level waveform whcih may be generated by the inverter in FIG. 2. In controlling the inverter, the basic constraint is to have an odd quarter wave symmetry in a line to line voltage waveform. To have this symmetry and uniform pulse widths, the 150° conduction period is divided into five equal segments, ideally, each segment can have any number of equal width pulses.

If m is any integer 1, 2, 3, ... m, then to have the quarter wave symmetry in a line to line waveform, chopping frequency of the fixed amplitude triangle carrier should be 12 mf., where f is the frequency of the output waveform. With the result, (a) number of pulses in the half cycle of a phase waveform will be 6 m; (b) number of pulses in the half cycle of a line voltage will be 5 m; (c) the spacing between the centre of each pulse will be $\pi/6$ m rad.; (d) there will be 2 m number of pulses with the amplitude equal to 0.5 $E_D$; (e) number of pulses with the amplitude equal to $E_D$ will be 3 m; (f) the first pulse will be spaced at $\pi/12 + \pi/12$ m radians from the reference axis; (g) if $\delta$ be the variable pulse width of a pulse, the theoretical maximum pulse width will be $\Delta = \pi/6$ m radians.

The inverter in FIG. 2, with multilevel PWM operation, can provide voltage control and by varying m can also keep all harmonics including the fifth and the seventh below ten percent.

Though the inverter in FIG. 2 is shown as a single phase device, a multiphase device may be constructed on the same basis as this invention.

Many modifications in the above described embodiments of the invention can be carried out without departing from the scope thereof and, therefore, the scope of the present invention is intended to be limited only by the appended claims.

We claim:

1. A multilevel inverter comprising:

a voltage divider for connection across a dc source $E_D$ for providing voltages at terminals in a decreasing sequence from $+E_D$ to $-E_D$;

a first set of controlled ac switches connected between the positive voltage terminals and a load terminal for applying selected positive voltages to the load terminal, the main ac switch connected to the potential $+E_D$ being a controlled rectifier and a reverse connected diode;

a second set of controlled ac switches connected between the negative voltage terminals and the load terminal for applying selected negative voltages to the load terminal, the main ac switch connected to the potential $-E_D$, being a controlled rectifier and a reverse connected diode; and commutation means for turning off either of the main ac switches connected between the $+E_D$ terminal or the $-E_D$ terminal, the commutation means having a pair of series-connected commutation controlled rectifiers connected in parallel with the pair of main controlled rectifiers, a diode connected in reverse polarity across each of the commutation controlled rectifiers, capacitance means connected between the load terminal and a juncture between the commutation controlled rectifiers, and inductance means connected between the load terminal and the dc source.

2. An inverter as claimed in claim 1 which further includes an ac switch connected across the capacitance means for discharging the capacitance means.

3. An inverter as claimed in claim 2 which further includes an ac switch connected between the load terminal and a zero potential.

4. An inverter as claimed in claims 1, 2 or 3 wherein the inductance means includes an inductor connected in series with the capacitance means between the commutation controlled rectifier juncture and the load terminal.

5. An inverter as claimed in claims 1, 2 or 3 wherein the controlled ac switches are reverse connected thyristor pairs.

* * * * *